(12) United States Patent
Petiteau

(10) Patent No.: US 9,744,917 B2
(45) Date of Patent: Aug. 29, 2017

(54) AUTOMOTIVE VEHICLE INTERIOR PROTECTIVE DEVICE FOR THE TRANSPORTATION OF GARBAGE OR ANY SIMILAR PRODUCTS

(71) Applicant: Johan Petiteau, Saint Martin d'Uriage (FR)

(72) Inventor: Johan Petiteau, Saint Martin d'Uriage (FR)

(73) Assignees: Johan Petiteau, Saint Martin d'Uriage (FR); Michel Bouvier, Maubec (FR); Lionel Costa, New York, NY (US)

( * ) Notice: Subject to any disclaimer, the term of this patent is extended or adjusted under 35 U.S.C. 154(b) by 0 days.

(21) Appl. No.: 15/084,887

(22) Filed: Mar. 30, 2016

(65) Prior Publication Data
US 2016/0288734 A1    Oct. 6, 2016

(30) Foreign Application Priority Data
Mar. 31, 2015  (FR) ...................................... 15 52702

(51) Int. Cl.
*B60R 5/04*     (2006.01)
*B60R 13/01*    (2006.01)

(52) U.S. Cl.
CPC .............. *B60R 13/011* (2013.01); *B60R 5/04* (2013.01); *B60R 13/013* (2013.01)

(58) Field of Classification Search
CPC ..... B60R 13/01; B60R 13/011; B60R 13/013; B60R 2013/018; B60R 5/04; B60R 5/045; B60R 5/047; B60R 5/048

USPC ....... 296/24.4, 24.43, 39.1, 39.2, 37.8, 37.6, 296/37.16
See application file for complete search history.

(56) References Cited

U.S. PATENT DOCUMENTS

| | | | | |
|---|---|---|---|---|
| 2,911,253 A | * | 11/1959 | Dewey | B60R 13/01 296/39.1 |
| 3,937,363 A | * | 2/1976 | Anderson | B65D 7/26 220/6 |
| 4,789,574 A | * | 12/1988 | Selvey | B60R 13/01 296/39.2 |
| 4,877,281 A | * | 10/1989 | Altmann | B60R 13/01 220/495.01 |

(Continued)

FOREIGN PATENT DOCUMENTS

DE    102004056026 A1    6/2006
FR        2966099 A1    4/2012

*Primary Examiner* — Gregory Blankenship
(74) *Attorney, Agent, or Firm* — Bachman & LaPointe, P.C.

(57) ABSTRACT

The device for the protection of the interior of an automotive vehicle comprises a flexible liner at the inside of the vehicle and means for holding the liner in this interior. The liner has, at least in part surrounding its rear opening, a protective flap arranged to cover the edge of the trunk opening and at least the upper portion forms a flap continuous with the top side of the liner and incorporates means to hold the flap in position in the upper rabbet of the periphery of the trunk opening. The side flaps are provided for covering the rear edges of the lateral sides of the vehicle, and a rear closure panel, in a rearward extension of the bottom side of the liner, the trunk threshold and the bumper to be covered and is also sized to provide, when pulled up, a rear closure wall of the liner.

14 Claims, 4 Drawing Sheets

(56) References Cited

U.S. PATENT DOCUMENTS

| | | | | |
|---|---|---|---|---|
| 5,215,345 A * | 6/1993 | Orphan | ................ | B60N 2/3013 296/37.16 |
| 5,419,602 A * | 5/1995 | VanHoose | .......... | B62D 33/0273 296/37.16 |
| 5,722,710 A * | 3/1998 | Falciani | ................. | B60R 13/01 296/39.1 |
| 6,142,550 A * | 11/2000 | Blyth | ...................... | B60R 13/01 296/214 |
| 6,203,089 B1 * | 3/2001 | Doolittle, III | ......... | B60R 13/01 296/39.1 |
| 6,206,443 B1 * | 3/2001 | Konop | .................... | B60R 13/01 229/164 |
| 6,595,568 B1 * | 7/2003 | Schroeder | ............. | B60R 13/011 296/39.1 |
| 7,178,851 B1 * | 2/2007 | Gridley | .................. | B60R 13/01 296/39.1 |
| 8,449,010 B2 * | 5/2013 | Nelson | ............... | B60R 13/0815 296/214 |
| 2003/0107230 A1 * | 6/2003 | Keles | .................... | B60R 13/01 296/39.1 |
| 2005/0218682 A1 * | 10/2005 | Klotz | ....................... | B60R 5/04 296/39.1 |
| 2013/0161364 A1 * | 6/2013 | Tirrell | ...................... | B60R 7/02 224/275 |
| 2016/0031384 A1 * | 2/2016 | Lieberknecht | ........... | B60R 5/04 224/543 |
| 2016/0288734 A1 * | 10/2016 | Petiteau | .................... | B60R 5/04 |

* cited by examiner

AUTOMOTIVE VEHICLE INTERIOR PROTECTIVE DEVICE FOR THE TRANSPORTATION OF GARBAGE OR ANY SIMILAR PRODUCTS

BACKGROUND

The present invention refers to a device for the protection of the interior of an automotive vehicle specifically designed to transport waste. It could be typically used to transport green waste, brush, lawn clippings, garden waste, and the like, to the waste transfer station. This device can also be used for the enclosed transportation of any other object that might soil the interior of the vehicle used for hauling.

The goal of the device described by this invention is to ensure the cleanliness of the interior of an automotive vehicle during such transports. The vehicles involved here are essentially personal vehicles like a SUV or a station wagon with a trunk compartment accessible from the back of the vehicle through a hatchback door that opens vertically, rotating along an upper horizontal hinge. But it can also be adapted to any other type of vehicle like a classic sedan, light-duty trucks, vehicles with a rear door which pivots along a vertical axis, etc.

Nowadays, automobiles interior trim and upholstery are well designed, but are relatively easily damaged and soiled. Specifically, the door, trunk and ceiling trim parts cannot easily be taken apart and/or washed, it can therefore be important to protect one's vehicle's inside when transporting any sort of waste. But these vehicles are made for the transportation of passengers and their luggage and are not designed to hold a device used to protect the interior when transporting waste.

The result is that it is almost impossible to keep the interior of a car clean when transporting green waste to a rubbish dump.

A common solution is to use off-the-shelf tarpaulins, but the dimensions of these products are generally not adapted to provide a proper coating of the entire trunk. Moreover, even with pre-cut tarp sheets, it is difficult to maintain such sheets on substantially vertical sides, such as the side walls of the trunk, and even more difficult to use these sheets as a ceiling protection.

Other known protection devices include a trunk floor liner, a waterproof tray or specific carpet that can be better adapted to the dimensions of the trunk of different car models. But these devices do not offer any protection for the interior sides.

Other also known solutions are wrapping protection devices for small volumes of waste or other items, typically only 100 to 300 liters such as waste bags or wraps, possibly arranged to be almost hermetically closed. The protection provided by such devices can be effective but the useful volume is low and placed in a car trunk, the unusable volume of trunk space may be significant.

Other also known interior protection devices, able to protect all the sides of the cargo space are the following:

FR 2966099 describes such a system having a parallelepiped rectangle frame consisting of tubes assembled by nesting and supporting a tarpaulin covering the six faces of the frame, one of which is an opening that faces the hatch door. Such a system has the drawback of being only usable in a sufficiently regular trunk space for positioning said rectangular frame. Also its dimensions must be specific to each car model, otherwise unusable volume can exist between the structure, its tarp covering and the sides of the trunk space.

DE102004056026 shows in principle a more flexible system as it doesn't use a rigid frame. But the means to hold the protective envelope requires specific fittings to be installed in the vehicle. In addition, the holding of the envelope to these fittings, using hook-and-loop strips (Velcro® type) complicates the installation of the protective envelope. Moreover, the rear side is shaped as a single flap, and the result is that when the flap is open, as when loading or unloading, the rear edges of the lateral walls and of the top of the trunk are not well-protected.

US2013/0161364 shows a device similar to DE102004056026, and the holding means of the protective envelope using straps or hook-and-loop strips that have the same drawbacks as explained before.

In general, the known protective devices either do not allow optimal utilization of trunk space, or do not effectively protect all parts of the vehicle, and or require them to keep using straps or similar fastening devices which may complicate installation.

SUMMARY

The present invention aims to solve the problems mentioned above, and aims in particular to maximize the usable protected space in the passenger and trunk compartment by a device adaptable to different sizes of vehicles, thus requiring only a limited number of the most standardized possible sizes, therefore being more economical to produce using less warehouse storage space and less retail shelve space in stores. Therefore, the invention aims to avoid having to produce and store many different models, which models can still be produced by example in the case of a distribution by vehicle manufacturers, which would incur higher costs for design and manufacturing. Following this standardization goal, the invention also provides shape and holding methods compatible with the large variety of possible vehicle interior configurations. It also aims to ensure an effective protection of the entire cabin and its openings during both the transportation and the loading and unloading of waste.

The invention also aims to facilitate the installation of the device in the vehicle and its storage when not in use.

With these objectives in mind, the invention therefore relates to a protection device of the interior of an automobile vehicle, encompassing a flexible liner adapted to the interior of said vehicle and a coupler or holding means in the interior.

According to the invention, the device is characterized in that the liner encompasses, at least in part on the periphery of its rear opening, a protective flap which is positioned to cover the edge of the trunk opening, and which at least the top portion forms a flap in continuity with the wall of the top of the liner, and includes means arranged to hold said flap in the top groove of the trunk hatch opening.

The means to hold the liner can be provided by hooks, by magnets or by a specific cutout shape that folds around the edge of the trunk opening and more particularly is adapted to the periphery of the door joint which generally covers said opening edge of the trunk, or possibly aided by an elastic band located on the edge of the flap that holds the flap in the groove.

Vehicles conventionally have a groove intended to collect and guide rainwater around the trunk opening, between the upper edge of the trunk lid and the vehicle body. The edge of this groove bears a gasket against which the inner side of the trunk door panel is pushed when the trunk door is closed, in order to provide a sealed and airtight closure. The invention takes advantage of this groove to ensure a particularly simple way of holding the liner in the upper part of the trunk opening via the flap, while also covering the ceiling of the car interior near the opening of the trunk at its junction with the vehicle roof and the upper portion of the side walls with this flap. Thus, not only the protection of these areas is fully ensured, in particular during loading of waste such as branches or the like, but it also easily ensures the holding of the top side panel of the liner, including through the use of magnets or other holding means, and also when closing the hatch door, the flap is squeezed between the trunk gasket and the door, enabling a perfect hold.

Accordingly to a specific design, the flap extends laterally from the sides of the opening of the liner in an extension of its side panels, in the form of side flaps arranged to cover the rear edges of the side walls of the vehicle when loading or unloading waste to protect these side edges and the taillights commonly located on the sides of the rear chassis. The connecting areas between the top flap and side flaps are designed to cover the upper corners of the trunk opening, thus ensuring its protection.

The bottom side of the liner is extended towards the rear of the vehicle with a flap which, when pulled down and out, covers and protects the trunk threshold and the bumper during cargo loading and unloading operations. This flap is further dimensioned to constitute, when pulled up, a rear closure piece of the liner, which also protects the inner side—upholstery, paint and trim—of the trunk door (hatch) of the vehicle. This part is also preferably connected by flexible corner panels to the side flaps, to ensure continuity of the flap around the rear opening of the liner, particularly when the back panel is pulled down during loading and unloading. In the raised position of the closure back panel, side flaps and corner of flexible panels are folded beforehand inwardly, so that they are covered by the closing of the back panel, of which the edges may then be linked to rear edges of the side panels of the liner, by hooks, self-gripping strips or similar means of temporary fastening.

The rear closure panel is held up in order to obturate the rear opening of the liner, using a coupler having fastening means with the upper flap of the liner, or using hooks connected to the trunk hinges, or preferably by having its edges extending over the trunk seal, above the top flap, and also maintained by the magnets in the upper groove of the trunk opening.

According to a complementary arrangement, the top side of the liner is maintained forward by hooks adapted to hold on the passenger handles conventionally disposed in the passenger compartment above the rear side doors or rear side windows. In one specific design, the liner incorporates sleeves at the corners between the lateral liner sides and its top side, into which reinforcing rods can be slipped—possibly in a removable manner—in order to support the liner shape and avoid its sagging in the front part held only at the passenger handles. The fixation hooks on these handles can be made to freely slid over the reinforcing rods through an opening of the sleeves, giving access to the rod, thus allowing an easy adaptation of the position of those hooks depending on the position of these handles. These sleeve openings can also be multiple and with a small size in order to limit sliding of the hooks on the reinforcing rods through the sleeve parts surrounding an opening, thus better maintaining the position of the liner in the longitudinal direction of the vehicle, while maintaining adaptability to different sizes of vehicle by virtue of the multiplicity of these areas. Alternatively, the openings can be wider, the sleeve portions can be reduced to form only straps around the reinforcing rods and the hooks can then be locked in position on the reinforcing rods by using lock washers, tight O-rings, any jam-holding solution, etc.

Alternatively, the side panels are held in place by using fasteners with magnets. These magnets may be hold against a part of the vehicle body, for example at a door jamb, or against the periphery of the opening of a side door. In the latter case, the fastener is squeezed during the closure of the side door between the door and the weatherstrip seal of the door opening. Preferably, the fastener is held at the top of the B-pillar.

According to an optional provision, the front side of the liner has a hatch located laterally at the level of the front passenger seat in order to safely slide long objects towards the dashboard, above the backrest of the folded front passenger seat. This hatch can be closed up, when not used, by a flexible closure panel attached on the front side of the liner by means of hook-and-loop strips, zipper, buttons, etc. Preferably, the lower edge of said closure panel is attached integrally to the bottom side, or to the front side of the liner. In the open position, the closing panel is dimensioned sufficiently wide for this purpose, is unfolded forward without interruption from the bottom side or the front side of the liner, and covers the back of the folded front passenger seat on which it is held by a wedge or by suction cups, hooks or other similar means. The closure panel may even extend to partially cover the dashboard in front of the passenger front seat and be retained thereon similarly by suction cups, hooks, etc.

Furthermore, the liner may optionally also include a lateral hatch, facing a rear side door, this hatch enabling side loading. This hatch can be closed up by a flexible closure panel attached on the lateral side of the liner by means of hook-and-loop strips, zipper, buttons, etc. The lower edge of said closure panel is attached to the bottom side of the liner.

With the invention and its various manufacturing options, the protective device provides a simple, effective and inexpensive protection for the vehicle's interior trims, windows and other surfaces against dirt, scratches and, in part, against blows. The device is quick to set up and remove. It can possibly be pulled from the trunk to easily unload the waste into a lower bin. In the case of liners of relatively small dimensions, the latter may optionally be filled and then loaded.

The device takes up very little space when folded, and may in particular be wrapped on itself, stowed under the trunk floor or integrated with it. In this variant, during storage, the liner is folded onto itself along its bottom side—in this case preferably made of a rigid or semi-rigid material—then folded in half so that the lower part of the bottom side portion lines the floor area of the trunk of the vehicle. The advantage of this storage solution is that the protection device remains embedded in the vehicle and is always available through a simple deployment, as discussed later.

In another alternative storage solution, the device incorporates a storage assembly made of a flexible piece of fabric, of a suitable size so that it can provide an envelope that can maintain the device folded and rolled in a substantially cylindrical shape and two end hoods for covering the opposite ends the cylinder thus formed, which hoods are connected to the flexible fabric piece in a connection area and can be maintained in a closed area substantially diametrically opposite this connection area so that they cover and retain the flexible fabric piece that wraps the liner by covering its edges. A handle that can be used to carrying the device, is advantageously fastened on the lids in said closure zone, and thus ensures the maintenance of said lids and enables an easy handling of the device when not in use.

Other characteristics and advantages will emerge from the description which will be made of a device according to the invention, and its use.

BRIEF DESCRIPTION OF THE DRAWINGS

Reference will be made to the attached drawings in which:

FIGS. 5 and 5a-5h. illustrate the different phases through which the device can be folded onto itself to be stored in a car trunk according to a preferred variation.

DETAILED DESCRIPTION

Figure 1:
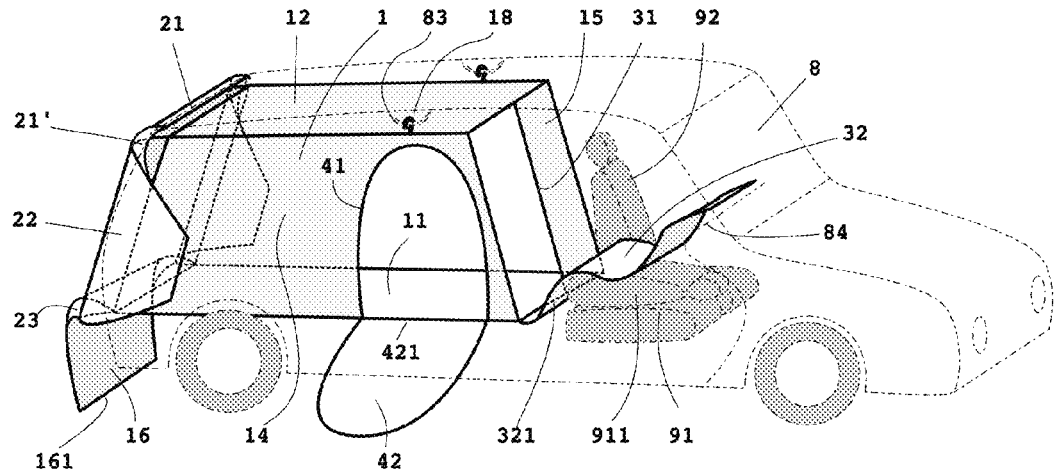
FIG. 1. is a schematic perspective view of a car equipped with a protective device in conformity with the invention. The mentioned car shape and its front seats are drawn in dash-dot lines.
Figure 2:
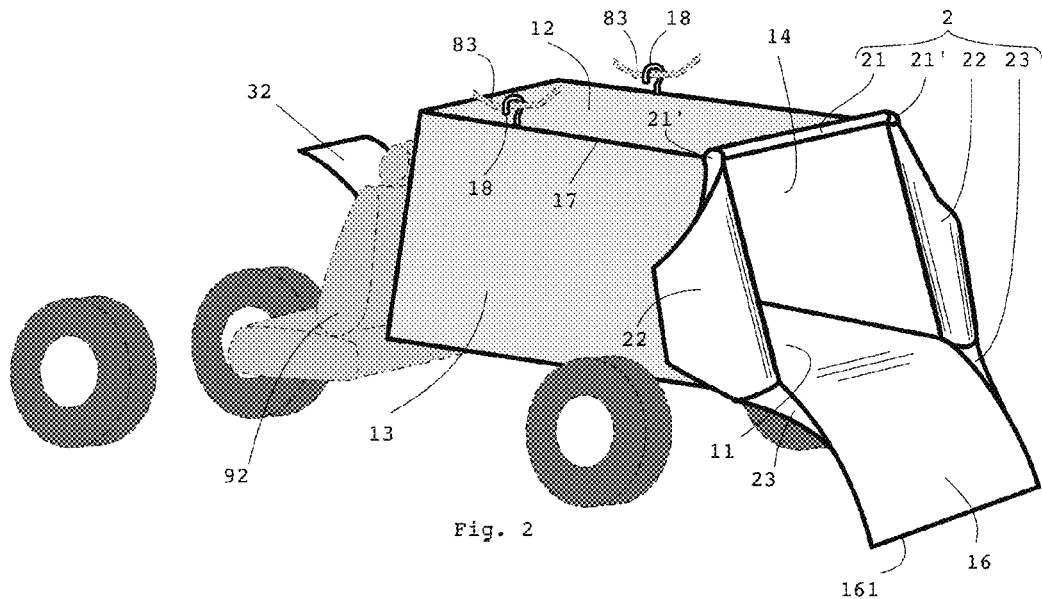
FIG. 2. is another view of the device in rear perspective view, installed inside a car simply symbolized by its 4 wheels and its front seats to better visualize the device and its positioning in the trunk.

In FIGS. 1 and 2, the protective device is shown in its extended position for use in a vehicle 8, in which the passenger front seat 91 and the driver front seat 92 are schematically shown.

The protection device is substantially made of a flexible liner 1 of a mostly parallelepipedic general shape, and more precisely of a shape adapted to the shape of the trunk space of the interior compartment 80 of the vehicle 8, as seen in FIG. 1.

The flexible liner 1 includes:
a bottom side or floor 11,
a top side 12,
two lateral sides 13, 14,
a front side 15.

The liner is made by example of a truck-type tarpaulin—a waterproof woven plastic fabric.

The different sides are connected together by sewing, gluing, welding, or other equivalent means, and present a full rear opening, i.e. extending over the entire surface of the rear side of the parallelepiped defined by the sides mentioned above.

The flexible liner also includes a rear closure of flap 16, shaped as the rearward extension of the bottom side 11, optionally in one piece with said bottom side, and dimensioned so as to close said rear opening when the flap is brought into a raised position.

Figure 4:
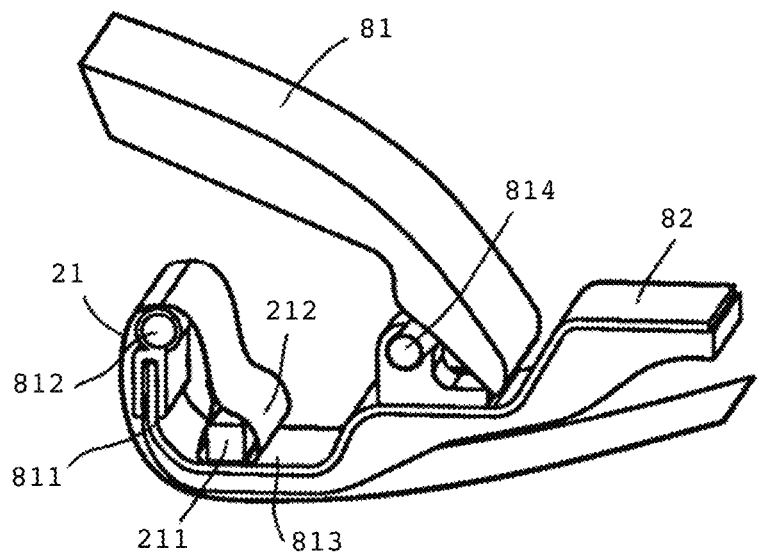
FIG. 4. shows a detail in section and perspective of the way the device is held in place on the top edge of the rear trunk opening.

The liner has on the periphery of its rear opening a protective wrap 2 which includes:
an upper part forming a flap 21, continuous with the top side 12 of the liner, and arranged to cover the upper edge 811 of the trunk, as seen in FIG. 4,
two side flaps 22 extending laterally from the sides of the opening of the liner in extension of the lateral side panels, and arranged to cover the rear edges of the side walls 82 of the vehicle.

The side flaps 22 are connected by their upper edges to the flap 21, and by their lower edges to the rear closure of flap 16, by means of the flexible corner panels 23, which may also be integrally formed with the side flaps 22.

Thus, the protective wrap 2 including the flap 21, the side flaps 22, the flexible corner panels 23, and the rear closing panel 16 provides a complete and continuous edge coverage of the opening of the trunk, either on its upper edge 811 by the flap 21, on its lateral edges, in particular encompassing the taillights, by the side flaps 22, and its lower edge including the rear bumper, covered by the rear closing panel 16, complemented by the flexible corner panels 23.

The flap 21 includes magnets 211, by example held in a hem 212 formed on the edge of the flap, so that when the flap 21 is folded over the upper edge 811 of the trunk opening, conventionally sealed by a weatherstrip seal 812, the magnets hold the hem 212 on the sheet metal lip of the chassis conformed to form the rabbet 813 of the trunk door 81, which is articulated by hinges 814 on the edge of the roof 82 of the car.

Alternatively, the flap 21 can be held simply by a shape 21' achieved in the connection zones of the flap with the flaps 22, the said shape is designed so that the said connection zones covering the rounded corners of the edge of the trunk naturally ensure the holding of the flap without a need for additional fixtures.

Figure 3:
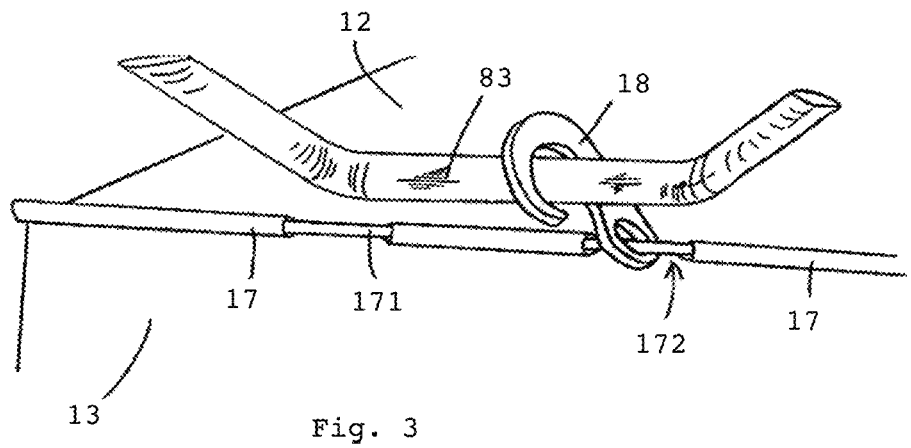
FIG. 3. details the device upper side holding solution on a back passenger handle.

As illustrated by FIG. 3, at the edges between the lateral sides 13, 14, and the top side 12, the liner 1 includes sleeves 17—into which reinforcement rods 171 are slid to stiffen the top side of the liner. Fastening hooks 18 are held on the rods 171, at the areas of discontinuity 172 of the sleeves, they can slide on the said rods 171, and the hooks 18 are configured to be held on the passenger handles 83, typically located above the car's rear passenger doors.

Advantageously, as illustrated in FIGS. 1 and 2, the front side of the liner includes a hatch opening 31, laterally located behind the front passenger seat 91, allowing long objects to be slid toward the dashboard above the folded front passenger seat 911. A flexible closure panel 32 is bonded with its lower edge 321 to the bottom side 11, continuous with the latter, or with a lower portion of the front side 15. When the hatch 31 is not used, it is closed by the flexible closure panel 32 attached on the front side of the liner by means of hook-and-loop strips, zipper, buttons, or other easy fastening means. To transport long objects, the hatch 31 is opened and the flexible closure panel 32 is folded over the back 911 of the forward-folded front passenger seat 91, and extends onto the dashboard 84 to protect the back of the said seat and the dashboard, and is maintained in position by any appropriate means.

Optionally also, the liner 1 may include a lateral hatch 41, at the level of a rear side door, which opening allows a side loading. A closure panel 42 is connected to the bottom side 11 of the envelope by its bottom edge 421, and ensures in its raised position the closing in a detachable by zipper, buttons, hook-and-loop strips or other. In the open position, the panel 42 covers the door sill for protection against any dirt.

To use the protective device, it is deployed in the vehicle, as seen in FIGS. 1 and 2, with its bottom side 11 lying on the floor of the vehicle. Its top side 12 is attached on the passenger handles 83 by the hooks 18 and the flap 21 is folded over the weatherstrip seal 812 and held in the rabbet 813 by the magnets 211. The flaps 22 are folded laterally outward to cover the side edges of the opening of the trunk door and taillights, and the closing panel 16 is folded over the threshold of the trunk and the rear bumper.

It is then possible to load, making maximum use of available space, thanks to the flexibility of the liner which enables it to adapt its shape to the actual space available in the car interior.

When loading is completed, the side flaps 22 are folded inwards, then the rear closing panel 16 is raised while holding the edge 161, preferentially by folding panel 161 over the flap 21 and holding the flap 21 with the coupler, such as, with the magnets connected to said edge 161. Other forms of coupler or means for holding the edge panel 161 can be used such as hook-and-loop strips, hooks, buttons, etc., connecting the end edge 161 of the back flap 16 on the flap 21 or close to it on the top side 12 for example, and optionally also attaching the side edges 162 of the panel 16 of the lateral sides 13, 14 of the liner.

When the back closure panel 16 is raised and attached, the trunk door 81 can be closed, thus squeezing and holding the flap 21, and possibly the edge 161 of the flap 16, between the said trunk door and the weatherstrip seal 812. To unload the device, the inverse operations can simply be performed, giving access to the cargo after unfolding the flap 16 down and the side flaps on the sides.

After unloading, and when the device is not used, the liner can be folded or rolled, stored either outside the vehicle, or saved folded in this manner or rolled in itself in the vehicle trunk.

Figure 5:
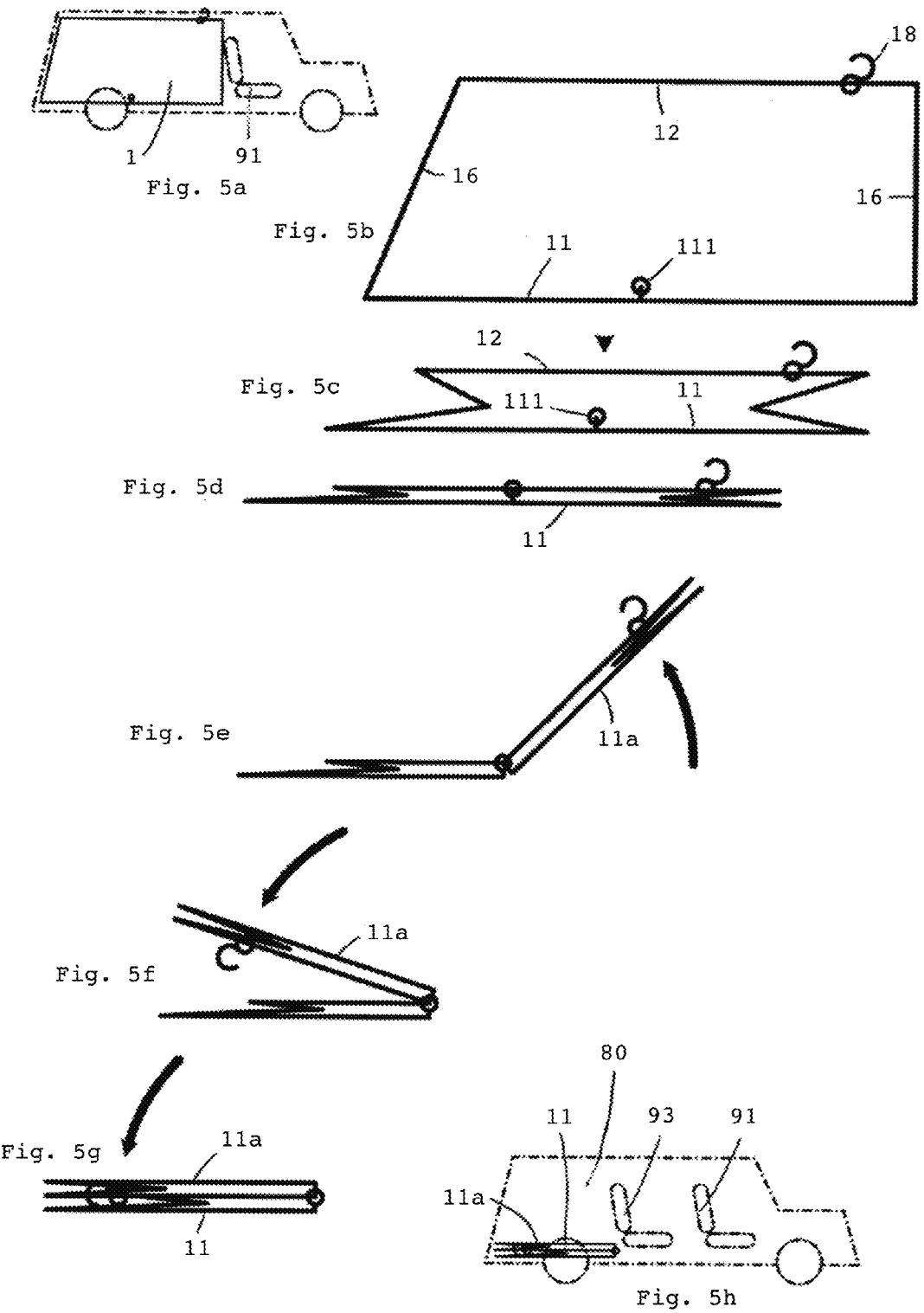

According to an advantageous solution illustrated in FIG. 5, the envelope can be folded onto itself and be used as a trunk floor mat that can remain permanently in the vehicle.

In the schematic view 5a on the top left of FIG. 5, the device is shown in position for use in a vehicle with removable rear seats which liner 1 extends from the trunk space into the rear passenger seat area—which were previously removed—up to the back of the front seats.

The envelope thus deployed is shown alone on the sketch 5b, where the presence of a hinge zone 111 shaped on the bottom side is shown, the so-said hinge zone is located substantially in the middle of the bottom side and oriented in the transverse direction of the vehicle. The bottom side 11 may be rigid and then the hinge zone is a true rigid or semi-rigid hinge. Alternatively, the bottom side 11 can remain flexible and hinge zone 111 can then be formed by a single fold, designed simply to shape a crease to facilitate folding of the envelope, as shall be seen hereafter.

To enable the storage of the liner, the fastening means holding the top side 12 under the vehicle ceiling should be removed, such as hooks 18 and the magnets 211, then the envelope is flattened onto itself, as shown in 5c sketch, taking advantage of the flexibility of lateral sides 13, 14, of the front side 15 and the closure flap 16 and other parts of the liner until the liner 1 is completely flattened, as shown in 5d.

The unit is then folded along the hinge 111, by bringing back the portion 11a located closest to the front, as shown in sketches 5e and 5f until the total folding position shown in 5g. The front portion 11a of the bottom side is then located above and parallel to the trunk floor, minimizing the size of the envelope. In that case the usable volume is virtually not reduced, permitting the replacing of the rear seats 93 in their normal use position as shown in the sketch 5h.

Figure 6:
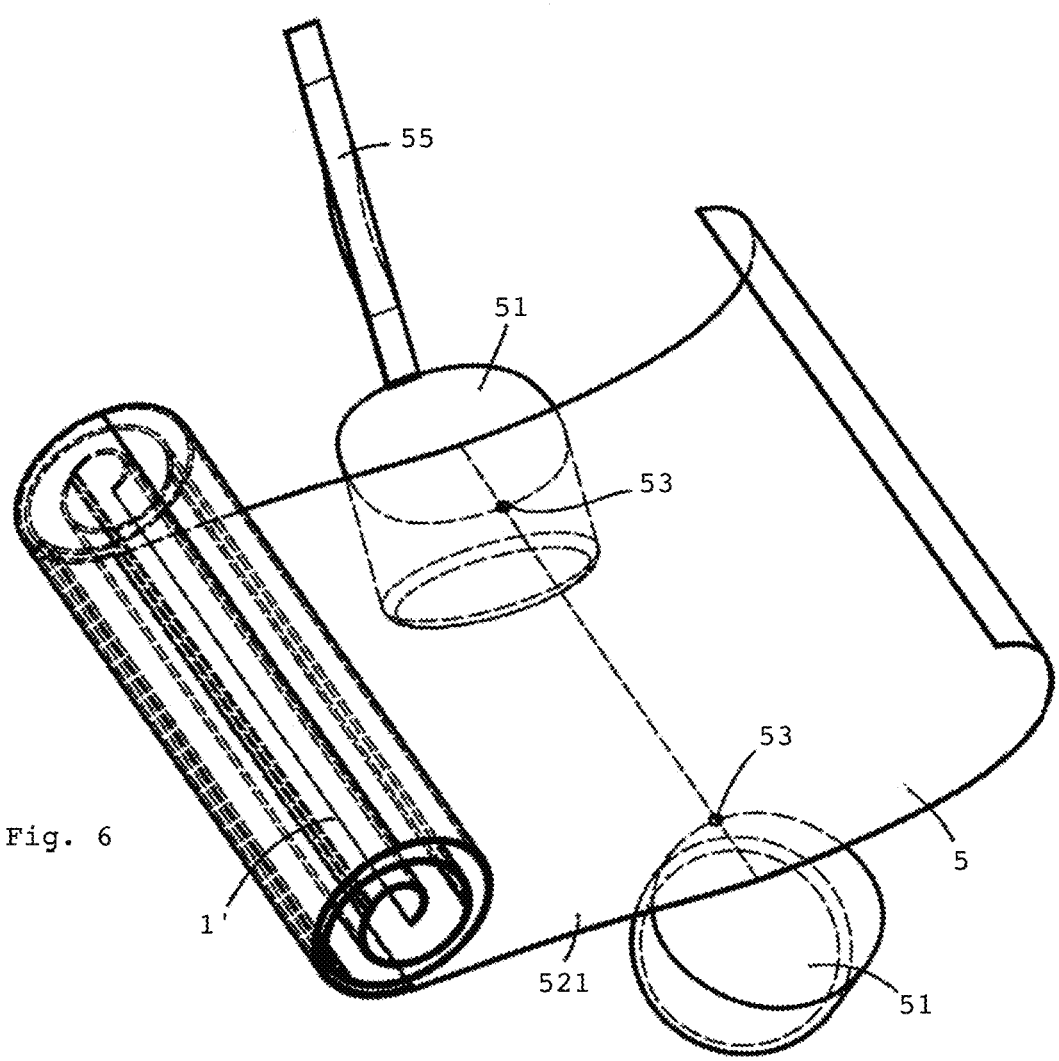
FIG. 6. shows the device ready to be rolled in a storage fabric piece.
Figure 7:
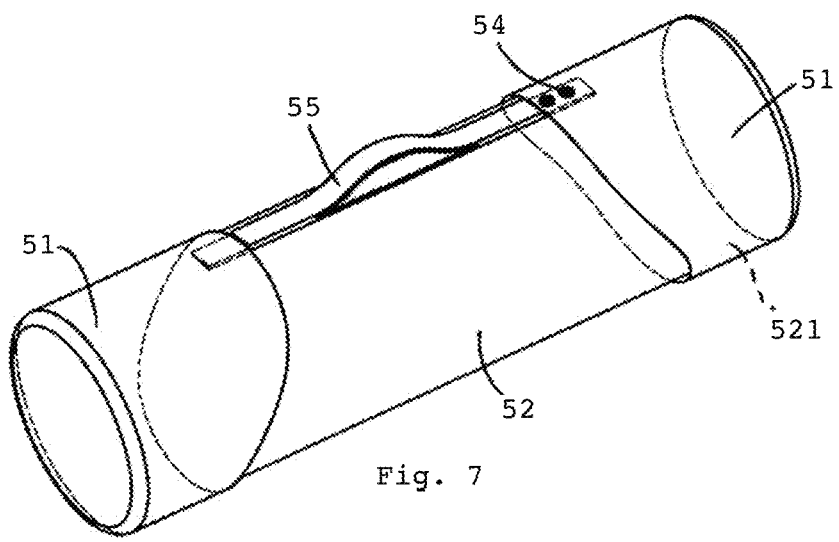
FIG. 7. shows the device stored in the storage fabric piece ready to be transported.

Another storage mode is illustrated in FIGS. 6 and 7. In this variant, the liner 1 is folded and wrapped upon itself to form a cylinder 1' and a canvas panel 5 is wrapped around the rolled liner. This storage sheet 5 comprises two side hoods 51, of generally cylindrical shape and preferably truncated obliquely, which can be folded over the ends of cylinder 52 formed by the liner 1' wound onto itself in the storage canvas 5, as shown in FIG. 7.

The lids 51 are attached to the canvas sheet 5, by example by stitching 53, which serve as hinges to allow the folding of the covers on the ends 521 of the cylinder 52. Furthermore, the lids can be held in this folded position, by closure means such as strap clips 54 or other equivalent means positioned in an area substantially diametrically opposed to the hinge areas. A carrying handle 55 is also provided, fixed to the panel 5 or can preferably be provided by a strap used for holding the lids connected in the folded position.

The storage fabric may be a simple rectangular canvas, not connected to the liner, on which the covers are fixed. The fabric 5 can also be linked to the liner 1, as shown in FIG. 6, for example by stitching or other equivalent means. The fabric may also be a part of one of the liner sides. The covers 51 may also be removable, fastened on the fabric 5 in the connecting regions, by snap buttons or the like.

The invention is not limited to the embodiment described above, which description is provided purely as an illustrative example.

In particular, maintaining the flap 21 may also be provided by other means than magnets, for example by hooks, e.g. hanging on the hinges of the trunk door, or by a particular shape of the lateral ends of the flap at the level of the connecting regions between the said flap and the side flaps, the said shape being designed so that said side flap ends can be inserted into the areas of the upper corners of the trunk opening. Such means may also be provided by elastic devices, for example a rubber band inserted in the hem 212, instead of the magnets, thus tightening the hem around the weatherstrip seal and thereby pressing the hem into the groove.

Also, hooks on the handles of the rear passenger seats used to hold the top side in place may be replaced by other temporary attachment means which are easily removable, such as for example hook-and-loop strips, etc.

The invention claimed is:

1. A device for the protection of an interior of an automotive vehicle comprising a flexible liner that can be fitted inside the vehicle and means holding the liner in the interior, wherein the liner comprises, at least in part on a periphery of a rear opening of the liner, a protective wrap which is configured to cover an edge of a trunk opening and of which at least an upper part forms a flap continuing a top side of the liner and comprises holding means designed to hold said flap in a peripheral rabbet of the trunk opening.

2. The device according to claim 1, wherein the holding means is provided by at least one of hooks, magnets, a shape adapted to the periphery of the edge of the trunk opening, and by an elastic band attached to an edge of the flap.

3. The device according to claim 1, wherein the flap extends laterally from the side surfaces of the opening of the liner, extending side panels of the liner in the form of side flaps configured to cover rear edges of the lateral sides of the vehicle.

4. The device according to claim 1, wherein said device comprises a rear closure panel in continuous extension of a bottom side surface of the liner which, when it is lowered, allows a trunk threshold and a bumper to be covered and protected, and when raised upwards, forms a rear closure side of the liner.

5. A device according to claim 3, wherein the rear closure panel of the liner is connected, by flexible corner panels, to the side flaps, ensuring a continuity of a protection flap around the rear opening of the liner.

6. The device according to claim 4, wherein the rear closure panel is held in a raised position, so as to close the rear opening of the liner, by at least one of a connection means with the upper flap of the liner, hooks connected to trunk hinges, having said liner edge extending over a trunk weatherstrip seal, over the upper flap, and also maintained by magnets in a groove of the upper rabbet of the trunk opening.

7. The device according to claim 1, wherein the top side of the liner is kept horizontal on a front side of the liner by means of hooks designed to be hung on back passenger handles of the vehicle.

8. The device according to claim 1, wherein the liner comprises sleeves at a level of the angles between the side walls and a sealing wall into which reinforcing rods can be at least one of inserted, and inserted in a removable manner to rigidify the liner.

9. The device according to claim 7, wherein the hooks for attachment to the passenger handles are mounted to slide at least one of freely and lockable in position on the reinforcement rods, in areas of discontinuity of the sleeves.

10. The device according to claim 1, wherein a front side of the liner comprises a hatch located laterally behind a front passenger seat, non-permanently closed by a flexible panel which is detachably fastened to said front panel and which can be deployed forward to cover a back of the folded passenger seat and extend to partially cover a dashboard.

11. The device according to claim 1, wherein the liner has a lateral opening located at a rear side door, and a closing panel used for closing the lateral opening in a detachable manner.

12. The device according to claim 1, wherein a bottom side panel has a hinge zone configured for the liner to be folded back onto itself so that an underside of the bottom panel once folded can be used as a vehicle trunk floor liner.

13. The device according to claim 1, wherein said device comprises a storage unit comprising a suitable flexible fabric piece adapted to wrap the liner folded and rolled onto itself in a substantially cylindrical shape, and two hoods for covering the opposing circular ends of the cylinder thus formed, which hoods are connected to the flexible fabric piece in a connection zone and configured to be maintained in a closure zone substantially diametrically opposite the connection so that covers retain the flexible fabric piece that wraps the liner by covering liner edges.

14. The device according to claim 13, further comprising a handle which can be used for transport, fixed to the hoods in a closing area.

* * * * *